March 14, 1933.  E. F. PULS  1,901,774
BRAKE BAND APPARATUS
Filed Jan. 18, 1929
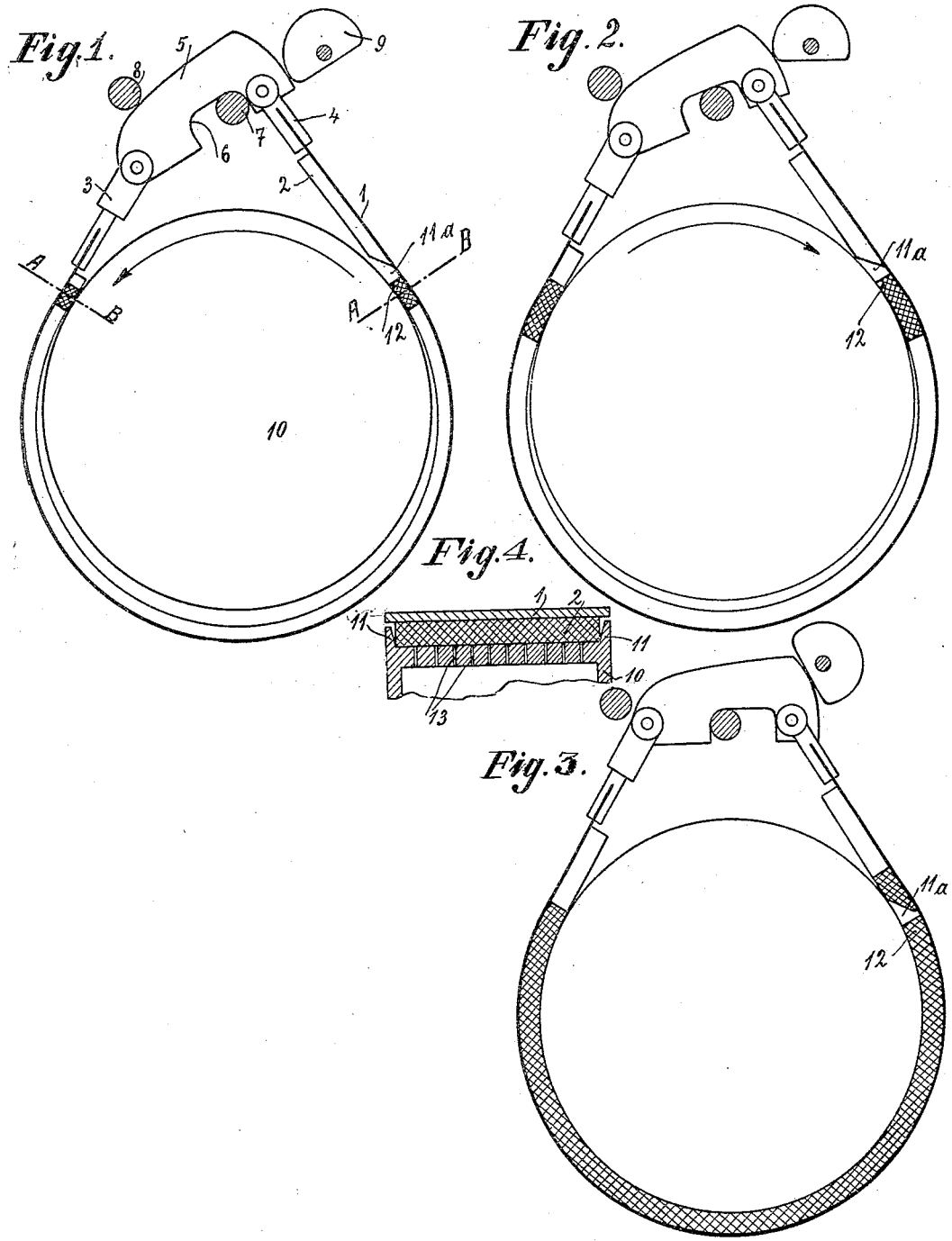

Patented Mar. 14, 1933

1,901,774

UNITED STATES PATENT OFFICE

ERICH FRIEDRICH PULS, OF EISENACH, GERMANY, ASSIGNOR TO THE FIRM PULSGETRIEBE GESELLSCHAFT MIT BESCHRANKTER HAFTUNG, OF EISENACH, GERMANY

BRAKE BAND APPARATUS

Application filed January 18, 1929, Serial No. 333,363, and in Germany January 27, 1928.

The invention refers to brake bands for change speed gears particularly for motor vehicles. In gears of this kind the braking effect is produced mainly by frictional drag of the drum on the brake band acting in the direction in which the drum tends to rotate when arrested by the brake and inactive when the drum is rotating in the opposite direction. In practice, with gears of this type, the band is permitted to float in the direction of movement of the drum and the brake-operating toggle is permitted correspondingly to float within limits defined by stops. It is found that this movement of the brake band is dependent on the coefficient of friction between the friction face of the brake band and the friction face of the drum. Thus, when the braking surfaces are lubricated to the same extent when operative as when inoperative, the coefficient of friction will be too large when the brake is inoperative, and too small when the brake is in operation. As a consequence, the brake becomes hot when inoperative, and, when the brake is applied, the frictional drag is too small to cause the requisite floating movement of the brake band.

An object of the invention is to provide means whereby the coefficient of friction may be varied according to the direction of rotation of the drum.

To this end, the invention consists in improved braking means including a drum having a peripheral lubricant-receiving groove, and a brake band closely fitting the groove so as in one direction of rotation of the drum to imprison a film of lubricant within the groove, the brake band, or rather the lining of the band, being formed with a gap which is so shaped and arranged, that, when the drum is rotated in the direction in which the brake is to be operated, one boundary of the gap acts as a scraper to expel the lubricant from the groove. By virtue of this arrangement, the brake band lining is sufficiently lubricated when inoperative, and, when the brake is applied, the lubricant is stripped off to such an extent that the coefficient of friction is increased.

In the accompanying drawing the invention is illustrated by way of example as operating in conjunction with such an operating device.

Figs. 1, 2 and 3 illustrate three different positions of the brake band, and

Fig. 4 is a section on the line A—B of Fig. 1.

In Figs. 1 to 3 the portions of the brake band lining in engagement with the drum are shown cross-hatched.

As shown, the brake band 1, which is provided with an inner lining 2, is connected by links 3 and 4 with a lever or toggle 5 notched at 6 for sliding engagement with the fulcrum bar 7. The movements of the lever 5 are limited by a stop 8 and a cam 9. The brake band 1 surrounds a drum 10.

The drum 10, as shown clearly in Fig. 4, is provided with peripheral tapering flanges 11 defining a groove closely fitting the lining 2. The lubrication of the engaging surfaces may be effected by introducing lubricant through perforations 13 in the circumferential wall of the drum through which oil from the inside of the drum may be forced out owing to centrifugal force of the drum, or by leading lubricant to the surface of the drum from outside. In Fig. 1 the brake band 1, 2 is shown as loosely embracing the drum 10. As will be seen by reference to the cross hatched parts in Fig. 1, only very small portions of the brake band lining 2 are in contact with the drum. When the drum is rotated clockwise as indicated in Figs. 2 and 3, whereby effective frictional engagement between the lining 2 and the drum is gradually established, the contacting surfaces are increased, as will be seen by reference to the cross-hatched portions shown in Figs. 2 and 3. In Fig. 3 all portions of the brake band lining which are concentric with the drum contact therewith so that the drum is under the effective control of the brake.

A portion of the brake band lining which, when the brake is inoperative, is in continuous contact with the drum, is interrupted by a gap 11ᵃ of which one boundary edge 12 serves as a stripper to expel the lubricant from the groove as soon as the brake is applied.

The operation of the device is as follows: The space between the operative surface of the brake band lining and the co-operative surface of the drum is laterally closed by the flanges 11, so that the lubricant, which enters the space from the interior of the drum by centrifugal force or which is otherwise introduced, is distributed over the braking surfaces. On clockwise rotation of the drum as indicated in Figure 2, that is to say at the commencement of application of the brake, further admission of lubricant to the braking surfaces is prevented by the brake band lining closely contacting with the surface of the drum. The edge 12 now acts as a stripper, so that the surface of the drum becomes dry and the coefficient of friction is increased and thus a sufficiently powerful frictional drag on the brake band is secured. When the drum is rotated counter-clockwise, as is indicated by the arrow in Fig. 1, the lubricant is imprisoned in the groove by the two small portions of the brake band in contact with the drum, shown cross hatched, and the lubricant accumulates between the band and the drum. Thus, effective contact between the brake band lining and the brake drum is interrupted and the coefficient of friction is so reduced that overheating is avoided. In actual practice there would be no contacting faces such as shown cross-hatched in Fig. 1. Fig. 1 shows the condition of the co-related parts immediately after reversing the rotation of the drum, that is to say, when it starts to run counterclockwise.

I claim:—

In a change speed gear, improved braking means comprising a drum having a cylindrical periphery and inclined flanges, a brake band having a lining and adapted to fit said periphery and to engage said flanges, means normally tending to urge the bands to engage the drum about its periphery, the said brake band or its lining having a gap formed near one end thereof, the said gap having a leading abrupt boundary and being so shaped that when the drum is rotated in one direction, the leading abrupt edge acts as a scraper to expel lubricant from the periphery of the drum, the other end of the band being continued slightly beyond the periphery of the drum so that it contacts tangentially therewith and so that when the drum is rotating in the opposite direction a film of the lubricant is imprisoned between the said drum and band, which film automatically raises the said band from the periphery of the drum, which band is ordinarily urged against the drum about its periphery by the said means.

In testimony whereof I have signed my name to this specification.

ERICH FRIEDRICH PULS.